Oct. 28, 1969     A. C. SCAVULLO     3,475,285
PROCESS OF PRODUCING COOKING UTENSILS
Filed Nov. 6, 1964
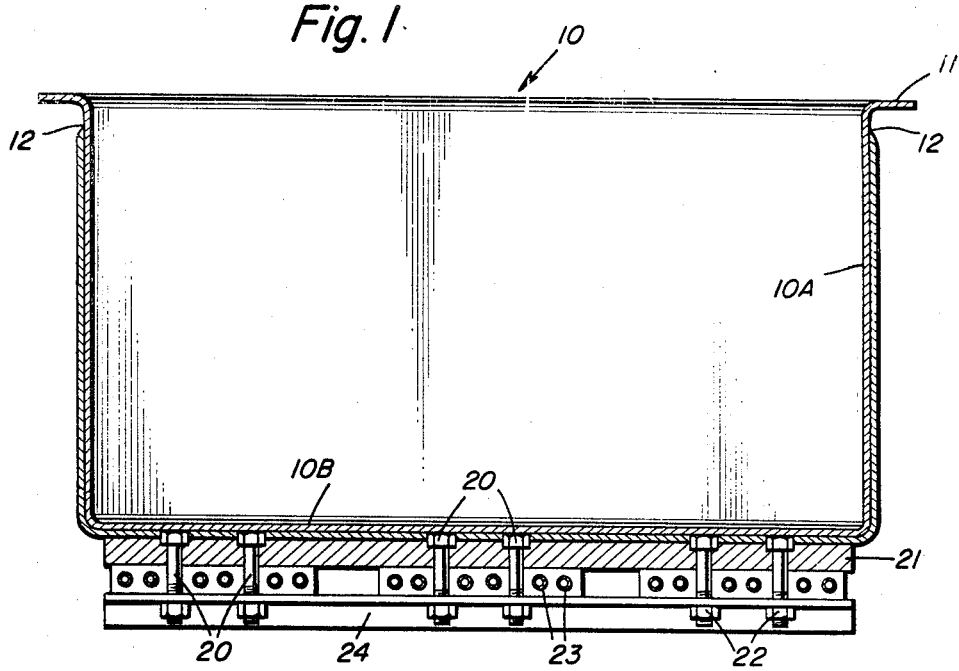
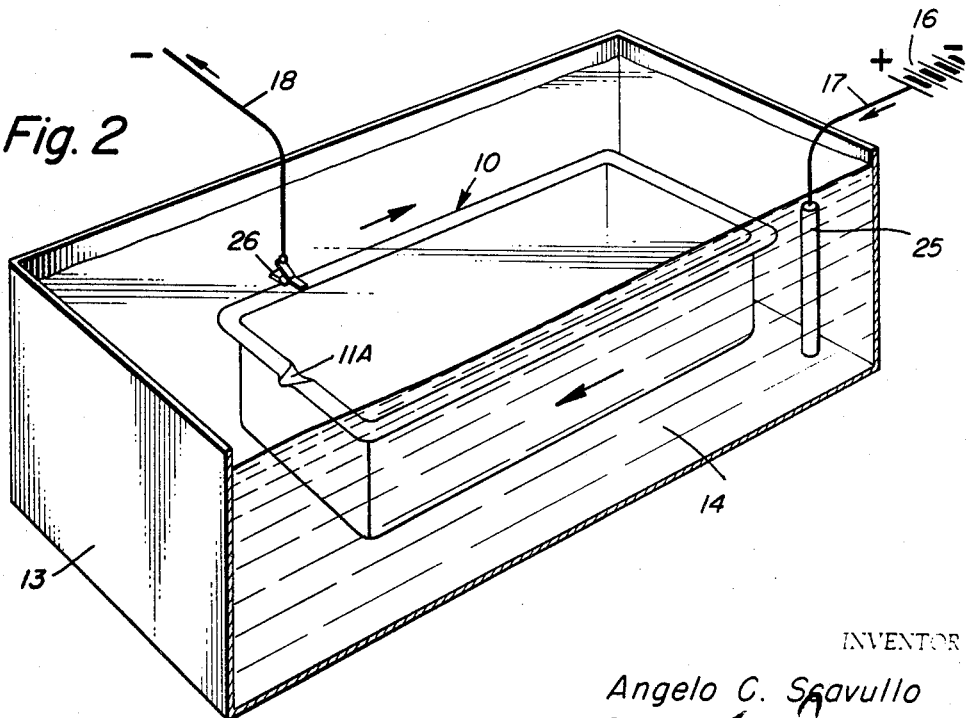
INVENTOR
Angelo C. Scavullo
BY
HIS ATTORNEY

United States Patent Office 3,475,285
Patented Oct. 28, 1969

3,475,285
PROCESS OF PRODUCING COOKING UTENSILS
Angelo C. Scavullo, Jamaica, N.Y., assignor to Legion Utensils Co., Inc., a corporation of New York
Filed Nov. 6, 1964, Ser. No. 409,416
Int. Cl. C23b 5/50, 5/18
U.S. Cl. 204—25             3 Claims

ABSTRACT OF THE DISCLOSURE

The production of a copper-clad stainless steel culinary vessel wherein the vessel is subjected to a light nickel plating in nickel electrolyte, then subjected to a light copper strike in copper electrolyte, and finally subjected to electrolytic treatment in copper bath solution while reciprocating the vessel back and forth within the bath at a frequency ranging from about 14 to about 20 cycles per minute for a length of time sufficient to obtain a dense, cohesive, adherent copper coating free from occluded gases and of desired depth.

---

My invention, having broad application to culinary utensils and equipment, more particularly concerns culinary utensils of elongated dimension such as tilt-type griddles or skillets.

An object of my invention is to provide a cooking utensil which, low in cost, simple in production, sturdy and of long, useful life, effectively resists corrosive attacks normally encountered in cooking processes, be it at household, commercial or industrial level and which, presenting an attractive and pleasing appearance, can be simply and directly formed to present the unique combination of high and uniform heat-conductivity along with strong heat-retention characteristics, by reason of which heat applied to the utensil will distribute itself rapidly and uniformly throughout the same, with attendant avoidance and elimination of localized hot spots with its accompanying scorching, the while providing uniform heating throughout the walls of the vessel, be it griddle, skillet or other utensil; the utensil being further characterized, in large measure as a result of simple and direct manner of production, by continuity of surface and absence of seams, welds, or other interruptions of the surface of the finished product.

A further object is to provide a vessel or utensil of the general character described, which presents an attractive and pleasing appearance and which, being impervious to foodstuffs, effectively eliminates the contamination of such foodstuffs cooked therein by reason of residual accumulation of previously cooked foods.

A further object of my invention is to provide a method and apparatus which will participate importantly in the production of such utensil in simple, direct, efficient and economical manner.

Other objects and advantages attend the practice of my invention, obvious in part, and in part pointed out hereinafter during the course of the following description when considered in the light of the accompanying drawings.

Thus my invention resides in the many novel features of construction; in the combination of material, elements and parts; in the interrelation thereof; in the several procedural steps; and finally, in the relation of each of the same to and with one or more of the others, the scope of the application of all of which is more fully recited in the claims constituting part of this disclosure.

In the several views of the drawings, wherein I have disclosed that embodiment of my invention which I prefer at present:

FIG. 1 typically discloses a built-up, copper-clad stainless steel skillet embodying the features of novelty of my invention; while FIG. 2 discloses in perspective the skillet according to FIG. 1.

In both these two views of the drawings, like reference characters denote like structural parts.

To permit a more thorough understanding of certain features of my invention it may be noted at this point that the practitioner in the art of cooking utensils is in large measure, particularly in the production of those utensils intended for commercial or industrial practice, confronted by the choice as a material from which to form the utensil, of cast iron, aluminum alloys, or stainless steel. Now, both cast iron and aluminum, while having in common the advantageous quality of high heat-conductivity, are not entirely satisfactory, in that utensils formed therefrom not only tend to warp in use, but are subject to corrosive attack of the foodstuffs cooked therein, and are subject to contamination of foods cooked therein by the retained residue of previously cooked foods. Any saving in initial investment through the use of iron or aluminum is more than offset by the increased labor demands in attempted proper maintenance during service.

Stainless steel, as the base material from which the utensil is formed, can be deep-drawn or otherwise formed through direct procedures into a utensil of the proper size, dimensions and configurations. It has pleasing appearance. It displays exceptional resistance to corrosive attack by the foodstuffs cooked therein. The surfaces thereof may be readily cleaned. Its smooth, shiny surface, attractive and pleasing to the eye, effectively supresses any contamination of foodstuffs undergoing cooking therein by reason of any retained residues of foods which have been previously prepared in such utensils. Particularly suitable for such purposes (although I am by no means limited to the particular alloys discussed) are the austenitic chromium-nickel stainless steels, especially those wherein the chromium content ranges from 10% to 25%, while the nickel content ranges from 7% to 15%, with remainder substantially all iron.

It has long been recognized, however, that a serious deficiency in such stainless steels in their characteristic low heat-conductivity. By reason of this, heat applied to one portion of such utensil say, at a given point on the bottom thereof, will not diffuse with sufficient rapidity to other portions of the utensil. On the contrary, remaining concentrated in the region of initial application, the quantum of applied heat builds up, resulting in localized hot spots. By well nigh inevitable consequence foods closely overlying these localized hot spots within the utensil will burn unless the mass of foodstuffs is subjected to continual stirring, while food in other portions of the utensil will be insufficiently cooked.

One proposed solution to the unequal distribution of heat in the stainless steel utensils has been to provide a utensil which, formed of stainless steel on its interior, is clad on its exterior with a jacket of copper of requisite thickness. This utilizes the advantageous qualities of the chromium-nickel stainless steels previously described, while effectively availing of the excellent heat-conductive characteristics of copper. Following this proposal, utensils have been produced with the two metals (stainless steel and copper) which are tightly fitted together and spot-welded. For numerous reasons, however, this expedient demonstrates no practical merit. Illustratively, cracks were found to form between the metals. When water would creep into these cracks during cleaning, warping and blistering was observed in subsequent use.

When attention was given to electroplating the copper coating on the stainless steel utensils following some of the techniques heretofore available in the art, these did not prove satisfactory. An adequate and uniform copper coating could not be obtained. Non-uniformity was observed. Particularly was this true of elongated vessels, whether shallow or deep in depth, and whether regular or irregular in cross-section.

According to my present invention, however, the characteristic disadvantages set out above have in large measure been overcome. I have successfully united copper to both side and bottom of a stainless steel vessel in closely adherent, uniform coating, in the substantial absence of detrimental lumping or skipping, and this, upon elongated utensils, regardless of precise dimensions, shape or depth. I accomplish this in simple and direct manner, taking advantage of a motion phenomenon which I discovered and which causes requisite and superior distribution upon and adherence of the copper to the stainless steel base.

Referring now more particularly to the practice of my invention, and as an initial step, I deep-draw stainless steel sheet to size and dimension. Following the initial forming of the vessel, I mark the height along the side of the same to which I desire the plating to extend. This height is determined empirically, so that heat distribution will be uniform throughout the utensil when the latter is employed in cooking processes. Once the side of the vessel is thus marked, I mask, as with tape, that portion of the exterior surface which I desire to protect from copper plating.

With the vessel thus properly masked, I attach plating contacts thereto. And I wax the interior of the vessel with beeswax or the like, to protect it from the plating action. As a next step, I degrease the exposed metal by washing in some suitable preparation such as Oakite (potash). I follow this with a rinse in muriatic acid solution thereby, through etching the surface of the stainless steel metal, facilitating adherence of the copper in the ensuing plating operation. Where a particularly heavy plating is desired, I may abrade or roughen the surface to be plated, as by grinding or abrading, and thereafter passivate the abraded surface by immersion in the muriatic acid.

Next I immerse the vessel in a nickel chloride electrolyte and apply a light nickel plate, after which the vessel is rinsed with water, then muriatic acid.

I provide an initial copper deposit on the prepared surface of the tank, sink or other elongated vessel through copper strike in electrolytic cyanide, both at high current density enduring for but a short time interval. And I follow this with a water rinse. I next copper plate the utensil in an acid copper solution, both the current density and duration of which, along with its concentration, depend upon the size of the vessel undergoing plating.

It is an important feature of my invention that, during the actual step of electroplating in acid copper solution, I reciprocate the vessel or utensil undergoing plating back and forth in the plating tank, in linear, horizontal motion. I have observed that while with such linear movement a uniform, coherent and adhesive coating of copper is obtained, of requisite depth, satisfactory plating of elongated vessels cannot be obtained in its absence.

When a deposit of requisite thickness has been obtained, I discontinue the electro-plating operation, rinse the utensil in water, and then proceed to dissolve the wax, thereafter cleaning in Oakite or similar solution. Following this, I wash first in cold water, and then in hot water.

Giving attention now to a more specific and preferred illustration of the practice of my invention, therein I employ a preformed vessel which typically has a configuration somewhat of a tank or sink, rather shallow in depth and rectangular in horizontal cross-section. This vessel, which I indicated generally at 10 in FIG. 1, is formed of stainless steel, preferably selected from the austenitic grades of chromium-nickel alloys, with particular preference to those containing from about 10% to about 25% chromium, from about 7% to about 15% nickel, and the remainder substantially all iron.

Deep-drawn, or fabricated by known processes such as welding, the formed vessel is inexpensively produced to desired configuration and dimension. And in the preferred embodiment I provide an outwardly flaring rim 11 extending peripherally about the top edge of the vessel 10. In one mode of utilizing a vessel of the general type described, I conveniently mount it for tilting, in manner well known to the art. Typically, I provide a pouring lip 11A at suitable point along the tope edge of the same.

I am by no means limited to particular dimensions for the vessel 10, since it may be produced in a variety of sizes, conveniently adapted for household, commercial or industrial use. For example, the major horizontal interior dimension may be 24 inches, while the minor horizontal interior dimension also may be 24 inches. The interior depth may be 7 inches. While the smaller and undersize vessels ordinarily are deep-drawn from sheet stock, the vessels of larger size usually are fabricated from sheet by bending and forming and then welding. Actually, the size of a welded vessel may range from about 2 feet by 4 feet on up to about 4 feet by 4 feet, or even more. The interior depth may range from several inches on up to 10 inches or more, it being readily apparent that depth can be varied within reasonable and modest limits. The vessel presents a uniform surface free of seams or welts where dirt or cleaning compounds might lodge, or where leaks might start.

Where attaching means are to be fitted to the utensil, the bolts 20 or the like of FIG. 1 are made fast to the preformed vessel at this point in the construction of the utensil. Generally, the heads of such bolts are secured to the stainless steel preformed vessel as by welding or by brazing.

Next, I mark the vessel thus formed through deep-drawing or other selected constructional technique, along its exterior side wall in convenient manner, to locate the height to which the copper plating is to extend. Such line is indicated generally at 12 in FIG. 1, where the copper plating is shown as extending to a point just short of the top of side wall 10A. I find this proportionality permits, in finished product, rapid heat dissemination from region of initial application of heat at the bottom 10B throughout virtually the entire extent of vessel 10.

With vessel 10 thus marked, I next mask with tape the portion above line 12 to keep the masked area free from copper deposit. With plastic tubing I mask bolts 20 or other protuberances which I may provide on the exterior of the utensil, as noted above. In conventional manner and following accepted practices, I apply plating contacts to vessel 10. The utensil is now virtually conditioned for submerging in a bath of electrolyte, all as hereinafter described in greater detail. But preliminary to such immersion of vessel 10, I wax the interior thereof with any suitable wax conventional on the market and capable of protecting the interior from plating, conveniently using for this purpose beeswax. Degreasing is thereupon accomplished, as by washing with Oakite. This is followed by roughening the surface to be plated, either by mechanical abrading in well known manner or by etching in dilute muriatic acid rinse.

Next, I single-clad the stainless steel vessel, as thus roughened, by lightly nickel-plating the same in nickel chloride electrolytic bath maintained within a suitable plating tank. I follow this by rinsing, first with water and then with muriatic acid. In this step, the muriatic acid serves as a final cleaning step, prior to copper plating.

I then give the lightly nickel-plated vessel a copper strike as by electrolytic treatment in a cyanide bath for a short time at heavy current density, following which the vessel is rinsed in water.

Both the preliminary nickel flash and the initial copper strike are essential to the proper practice of my invention. Once the copper strike has been achieved, I water-rinse the utensil 10 with nickel strike followed by initial copper strike, thereby conditioning the same for the heavy copper plating operation.

I finally immerse vessel 10 in copper plating electrolyte 14 in tank 13 (FIG. 2). For this purpose I preferably employ an acid copper solution, the pH content of which is empirically determined, largely in dependence upon the size and configuration of the utensil undergoing plating.

Positive electrodes 25, of which preferably there are several, are made suitably fast to tank 13, and negative electrode 26 is made suitably fast to vessel 10. By means of direct current supply 16, connected by way of leads 17 and 18, I apply the desired plating current. This electroplating operation is continued for a period of from three to four days, until a coating is obtained having a thickness of about 0.045 inch.

Now, and as noted above, an extremely important area of my invention is that while the elongated vessel is undergoing the major plating operation, following the initial copper strike and subsequent water rinsing, I slide vessel 10 back and forth in tank 13, in reciprocating linear and horizontal motion at the rate of about 14 to about 20 cycles per minute. Such reciprocation is both necessary and important. For if the major plating operation takes place without movement of vessel 10 in tank 13, the resulting plating is extremely poor, uneven and uncertain. Moreover, if the rate of movement is lower than about 14 cycles per minute, unevenness and roughness is observed as the cyclical rate falls away from the critical 14-cycle frequency. On the other hand, particularly in the beginning phases of the true plating operation, should there be employed a cyclical frequency of linear reciprocation in excess of about 20 cycles per minute, the resulting plating is observed to be both spotty and too light. And in such instance it is well nigh impossible to obtain a heavy deposit. The plating tends to skip. Best results are had where the reciprocation amounts to about 16 cycles per minute.

For superior plating, reciprocation at the 16-cycle frequency endures throughout the plating operation, until the required depth of plating has been achieved. The resulting deposit is uniform, cohesive, adhesive, and free from entrapped gases. However, time demand is severe where 16-cycle reciprocation is maintained throughout the entire plating operation. Permissible compromise is observed, with little impairment of quality of deposit as viewed from a practical standpoint, if, after the first 24 hours of the plating operation, the plating process is speeded up to limited extent by gradually increasing the cyclical frequency to a maximum of about 24 cycles per minute. But this upper limit of 24 cycles per minute is likewise critical, since to exceed the same is found to be attended (as already suggested) by skipping in the plating operation, with plating that is both too light and of insufficient final depth. In this preferred practice, just as in the more generalized procedure as heretofore given, completion of the plating operation is followed by water-rinse. Wax is then dissolved in conventional manner, the Oakite solution is cleaned, and finally the finished product is first washed in cold water, followed by further washing in hot water. The utensil is now conditioned for use.

With utensil 10 still retaining its polished inner surface of stainless steel and uniform copper clad on its exterior, it is ready for mounting. In the embodiment disclosed in FIG. 1 the utensil is mounted on cast iron plate 21, stove bolts 20 with heads welded to the stainless steel preformed vessel being employed for this purpose. The copper-clad bottom of utensil 10 snugly overlies the top of cast iron plate 21 and is in intimate contact throughout its entire area so that the cast plate 21 effectively serves the dual function of a stiffening member and a heat accumulator. I next apply conventional heating elements 23, here shown as three in number, and fix them tightly against the iron plate as by the bolts 20 and hexagonal nuts 22. I employ one or more angle-irons 24 to serve both as an abutment and as a cover plate for the heating elements 23. By tightening the nuts 22 down in careful adjustment of applied torque, the heating elements are clamped uniformly against plate 21. With the heating elements thus clamped any localized hot-spotting resulting from inadequate contact between plate 21 and heating elements 23 is effectively precluded. And this is in sharp contradistinction from known utensils wherein heating elements customarily are sandwiched between the cast-iron plate and the bottom of the skillet or other utensil. Moreover, the plate 21 prevents buckling which might otherwise occur by reason of the difference in the coefficients of expansion of copper and stainless steel throughout the range of temperatures involved in actual use. And with the heating elements 23 and plate 21 in intimate contact with each other, the plate 21 assures sufficient accumulation of heat to provide good heat distribution, first from heating elements 23 to accumulator plate 21, and then through the bottom and sidewalls of the skillet, reliance being placed upon the copper-plated bottom to avoid localized hot spots which otherwise might be expected in the stainless steel bottom of utensil 10.

The dimensioning of the illustrative utensil according to the practice of my invention preferably is such that the completed utensil may be employed either as a skillet or a griddle. But, of course, it can be contoured and dimensioned for other uses. And in any event, and regardless of precise form and purpose, attack by foodstuffs undergoing processing is effectively resisted by the stainless steel inner surface. The utensil is clean, sanitary and impervious either to attack or to the retention of residual contamination from foodstuffs previously processed. The excellent heat distribution of the copper exterior, itself supplied with heat in sufficient quantity from the cast-iron bottom plate, effectively combats tendency of the interior bottom of the stainless steel vessel to accumulate heat in localized areas, while suppressing all tendency towards localized hot spots. Thus, distribution is effective along both the bottom of the skillet and to and through the side walls thereof.

As can be readily seen from the foregoing, my invention can be effectively applied to oblong or elongated vessels or to vessels of other configuration, either made in stainless steel or in single-clad stainless steel, as for example, a stainless steel interior layer backed by an exterior layer of mild steel.

My new construction is highly advantageous in practice because, as I have found, it is only when the interior is of stainless steel that the skillet or other utensil displays the requisite superior sanitary features; and it is only when a copper exterior of adequate and uniform thickness is offered toward the source of heat, that fastest and optimum heat distribution takes place, a distribution which is so vital to the proper function of a skillet.

In my new utensil and method there is achieved satisfaction in use, all with low cost in preliminary production and electroplating, as well as in final assembly.

Thus it will be seen that my invention comprises a utensil together with a method of producing the same, in which the several objects hereinbefore recited, together with many thoroughly practical advantages, are successfully achieved. There is produced a vessel which is rugged, is well adapted to its intended use, and is characterized by freedom from warping and blistering in use, giving uniform heating through bottom and side walls, all with preparation of superior fare for the table. My new utensil is produced in simple, direct and efficient manner. Any tendency toward either a lumpy or a spotty surface is avoided by the reciprocation of the vessel at stipulated frequency. An evenly-deposited copper coating on the vessel is assured, with full removal and escape of any gas bubbles which may be evolved during the plating process. The copper layer formed on the utensil is free of entrapped gas between the copper and the steel, and is both cohesive and adherent.

Since many possible embodiments may be made of my invention and since many changes may be made in the embodiment set forth herein, I desire that it be understood that all matter described herein and/or shown in the accompanying drawings is to be interpreted as simply illustrative, and not in a limiting sense.

I claim as my invention:

1. The method of copper-cladding an elongated stainless steel vessel which comprises subjecting the vessel to a light nickel plate in nickel chloride electrolyte; then subjecting the vessel to a copper strike in copper electrolyte; finally subjecting the vessel to an electrolytic bath of copper solution in which the vessel serves as a negative electrode and in which bath there is at least one positive electrode; impressing across said electrodes a direct current while reciprocating said vessel back and forth in a generally horizontal path within said electrolytic bath at a frequency ranging from about 14 to about 20 cycles per minutes for approximately 24 hours; thereupon increasing the frequency of reciprocation of the vessel to approximately 24 cycles per minute; and continuing the plating operation at advanced frequency of reciprocation to obtain a uniform, cohesive and adherent coating of requisite thickness.

2. The method of copper-plating a stainless steel vessel, comprising masking the exterior of the vessel above the area which the copper plating is to extend to prevent deposit of copper thereon; waxing the interior of said vessel for protection against plating; washing the vessel to degrease the same; rinsing the vessel with muriatic acid solution to clean and etch the surface of the metal; electro-plating in nickel chloride solution to obtain an initial nickel strike; rinsing in water, followed by a muriatic acid rinse; providing an initial and thin copper strike in an electrolytic bath at heavy current density enduring for but a short interval of time; next rinsing in water; thereafter plating in acid copper solution, at a current density and for a time sufficient to produce the requisite copper coating, while linearly reciprocating the vessel back and forth within the electrolytic bath at about 14 to 20 cycles per minute; and thereafter removing the vessel from the electrolytic bath, rinsing with water, dissolving off the wax, cleaning in a degreasing compound, and washing.

3. An austenitic chromium-nickel stainless steel vessel made according to the method of the claim 2, on the exterior of which vessel there is an electro-deposited uniform, coherent and adhesive layer of copper, free of occluded gases, with a closely adherent layer of nickel between the austenitic stainless steel and said layer of copper.

References Cited

UNITED STATES PATENTS

| | | | |
|---|---|---|---|
| 887,539 | 5/1908 | Stevens | 204—222 |
| 2,272,609 | 2/1942 | Kennedy et al. | 204—23 |
| 2,363,973 | 11/1944 | Kennedy et al. | 204—25 |
| 2,465,608 | 3/1949 | Scavullo | 204—15 |
| 2,967,134 | 1/1961 | Scavullo | 204—25 |

OTHER REFERENCES

Deposition of Metals Upon Stainless Steel, Joseph Haas and Elmer R. Unruh, The Metal Industry, November 1925, p. 451.

JOHN H. MACK, Primary Examiner

T. TUFARIELLO, Assistant Examiner

U.S. Cl. X.R.

204—15